No. 745,548. PATENTED DEC. 1, 1903.
W. J. WOODCOCK.
ICE MAKING MACHINERY.
APPLICATION FILED AUG. 26, 1902.
NO MODEL.
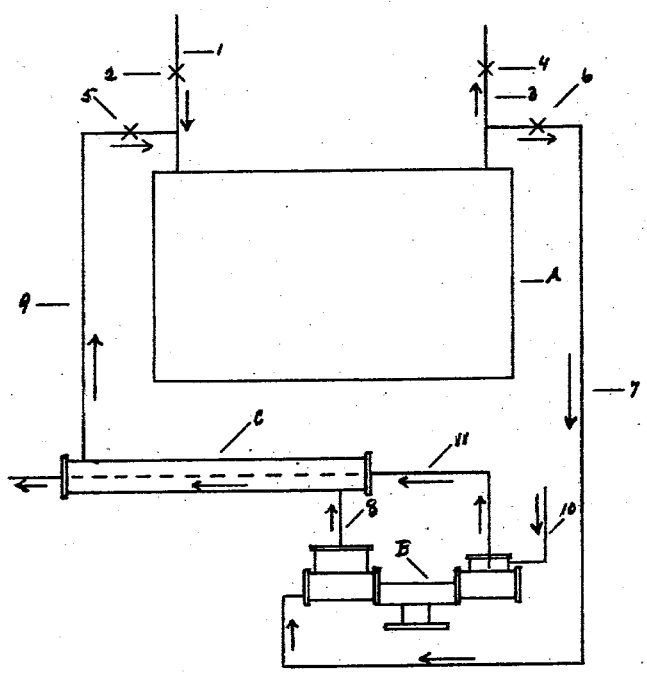
Willard J. Woodcock.
INVENTOR
WITNESSES:
W Wilson
N. Aymong No. 745,543.

Patented December 1, 1903.

UNITED STATES PATENT OFFICE.

WILLARD JAY WOODCOCK, OF BROOKLYN, NEW YORK, ASSIGNOR TO WOODCOCK PLATE ICE COMPANY, A CORPORATION OF NEW JERSEY.

ICE-MAKING MACHINERY.

SPECIFICATION forming part of Letters Patent No. 745,548, dated December 1, 1903.

Application filed August 26, 1902. Serial No. 121,097. (No model.)

*To all whom it may concern:*

Be it known that I, WILLARD JAY WOODCOCK, a citizen of the United States, and a resident of Brooklyn, in the county of Kings and State of New York, have invented certain new and useful Improvements in Ice-Making Machinery, of which the following is a specification.

This invention relates to the manufacture of plate-ice, and has for its object the tempering and thawing of the ice cakes from the freezing-plates in less time than that required by present methods and increasing the output for a given freezing area.

Various means are employed to loosen the ice from the freezing-plates. In the direct-expansion system warm ammonia-gas is admitted to the freezing-plate after the cakes are frozen to thaw them from the plate, but only after the freezing has ceased for about twelve hours. During this time the water draws the frost from the ice or tempers it. If gas were admitted immediately after the freezing ceased, the difference in temperature would shatter the ice. With systems using brine circulation the same loss of time occurs, for the same reason as above stated. By means herein shown and described this loss of time is eliminated.

The accompanying drawing illustrates the invention diagrammatically.

A is a freezing-plate, through which the liquid refrigerating medium, such as brine, circulates.

B is a steam-pump, and C a brine-heating cylinder.

The freezing-plate A, pump B, and cylinder C are connected by the conduits 7 and 9, so that a continuous circulation of the brine from plate to pump and thence through the cylinder C back to the plate can be maintained. Through the cylinder C passes a pipe 11, which connects with the exhaust of steam-pipe B.

The operation is as follows, arrow representing direction of flow: Brine at the freezing temperature desired enters the freezing-plate A through pipe 1 and valve 2 and leaves it by way of pipe 3 and valve 4. After ice is frozen to the desired thickness valves 2 and 4 are closed. It is now desirable to remove this ice cake as quickly as possible and start another freezing. Valves 5 and 6 are immediately opened and the steam-pump B started, causing the cold brine which is in the freezing-plate A to circulate through pipe 7, steam-pump B, pipe 8, brine-heater C, pipe 9, and successively through this cycle. Pipe 10 supplies steam to operate the steam-pump B, the exhaust-steam passing through pipe 11 into the brine-heater C and out into the atmosphere. The brine-heater C is so proportioned that the brine passing through it is only slightly warmed during each passage. It is evident that the brine at the temperature when the freezing-valves 2 and 4 are closed if circulated immediately and only slightly heated when passing through the heater will begin to temper the ice in the coldest part, and after it has reached 33° Fahrenheit will thaw it from the plate. It actually requires but one hour and thirty minutes after the valves 2 and 4 are closed, with brine at 25° Fahrenheit, to thoroughly temper and free the ice cake ready for delivery.

What I claim as new is—

1. In combination with a freezing-plate, a source of supply of liquid refrigerating medium thereto, and means for cutting off said supply and thereby confining a portion of said medium in said plate, a heating device and means for causing the circulation of said confined medium through said plate and heating device; whereby said medium at each successive passage through said heating device receives an increment of temperature before reëntering said plate.

2. In combination with a freezing-plate, a source of supply of liquid refrigerating medium thereto, and means for cutting off said supply and thereby confining a portion of said medium in said plate, a heating device, means for maintaining said heating device at substantially constant temperature, and means for causing the circulation of said confined medium through said plate and heating device; whereby said medium at each successive passage through said heating device receives an increment of temperature before reëntering said plate.

3. In combination with a freezing-plate, a source of supply of liquid refrigerating medium thereto, and means for cutting off said supply and thereby confining a portion of said medium in said plate, a heating device, and a steam-pump for causing the circulation of said confined medium through said plate and heating device; the said pump delivering its exhaust to said heating device whereby the temperature of said heating device is maintained substantially constant.

4. The combination with the freezing-plate A, steam-pump B and cylinder C and conduits connecting the same, of the pipe 11 within said cylinder and connecting with the exhaust of said pump, substantially as described.

Signed at Brooklyn, in the county of Kings and State of New York, this 7th day of August, A. D. 1902.

WILLARD JAY WOODCOCK.

Witnesses:
 THOS. J. REDMOND,
 N. AYMONG.